United States Patent
Ozone

(10) Patent No.: US 8,411,023 B2
(45) Date of Patent: Apr. 2, 2013

(54) IMAGE DISPLAYING APPARATUS HAVING AN IMAGE CORRECTING SECTION AND LUMINANCE ADJUSTING SECTION

(75) Inventor: Akihiro Ozone, Yokohama (JP)

(73) Assignee: Nikon Corporation, Tokyo (JP)

( * ) Notice: Subject to any disclaimer, the term of this patent is extended or adjusted under 35 U.S.C. 154(b) by 372 days.

(21) Appl. No.: 12/796,022

(22) Filed: Jun. 8, 2010

(65) Prior Publication Data

US 2010/0315447 A1  Dec. 16, 2010

(30) Foreign Application Priority Data

Jun. 15, 2009 (JP) ................................ 2009-142371

(51) Int. Cl.
*G09G 3/36* (2006.01)
(52) U.S. Cl. .......................................... 345/102; 345/89
(58) Field of Classification Search .................. 345/690, 345/89, 102
See application file for complete search history.

(56) References Cited

U.S. PATENT DOCUMENTS

| | | | |
|---|---|---|---|
| 2008/0100554 A1* | 5/2008 | Mori ................................ | 345/89 |
| 2008/0273094 A1* | 11/2008 | Kunieda ..................... | 348/220.1 |
| 2009/0295842 A1* | 12/2009 | Okada et al. .................. | 345/690 |
| 2010/0120471 A1* | 5/2010 | Uchikawa et al. ............ | 455/566 |
| 2010/0321414 A1* | 12/2010 | Muroi et al. .................. | 345/690 |

FOREIGN PATENT DOCUMENTS

| JP | A-2006-308632 | 11/2006 |
|---|---|---|
| JP | A-2009-17306 | 1/2009 |

* cited by examiner

*Primary Examiner* — Chanh Nguyen
*Assistant Examiner* — Long D Pham
(74) *Attorney, Agent, or Firm* — Oliff & Berridge, PLC

(57) ABSTRACT

An image displaying apparatus includes a displaying section capable of performing a luminance adjustment, an image correcting section performing a luminance correction on each of a plurality of images at a time of a dynamic display continuously displaying the plurality of images on the displaying section at a constant interval, a luminance adjusting section performing a luminance adjustment at the displaying section displaying the images to which the luminance correction is performed based on the luminance correction at the image correcting section, and a display controlling section performing a control at the luminance adjusting section within a shorter period than the constant interval when switching from the dynamic display to a static display displaying an image different from the plurality of images.

5 Claims, 6 Drawing Sheets

IMAGE DISPLAYING APPARATUS HAVING AN IMAGE CORRECTING SECTION AND LUMINANCE ADJUSTING SECTION

CROSS REFERENCE TO RELATED APPLICATION

This application is based upon and claims the benefit of priority from Japanese Patent Application No. 2009-142371, filed on Jun. 15, 2009, the entire contents of which are incorporated herein by reference.

BACKGROUND

1. Field

The present application relates to an image displaying apparatus displaying images and an imaging apparatus acquiring images.

2. Description of the Related Art

Conventionally, an imaging apparatus enabling power saving by reducing luminous of a backlight for an input image signal is provided as a reducing means of power consumption of an image display in the imaging apparatus (for example, Japanese Unexamined Patent Application Publication No. 2006-308632 and so on).

However, in the above-stated imaging apparatus, a change speed of a backlight luminance correction is slow when a screen changes from a moving image reproduction and a through image display to a still image display and a menu image display. As a result, there is a case when an unintended change in a display screen occurs. The change in the display screen as stated above may be a cause of deterioration in operability and embarrassment to user.

SUMMARY

A proposition of an image displaying apparatus and an imaging apparatus according to the present application is to prevent a change in a display of a still image and a menu image resulting from a backlight luminance correction and so on performed on a moving image and a through image.

An image displaying apparatus according to an aspect of embodiment includes a displaying section capable of performing a luminance adjustment, an image correcting section performing a luminance correction on each of a plurality of images at a time of a dynamic display continuously displaying the plurality of images on the displaying section at a constant interval, a luminance adjusting section performing a luminance adjustment at the displaying section when displaying the images to which the luminance correction is performed based on the luminance correction at the image correcting section, and a display controlling section performing a control at the luminance adjusting section within a shorter period than the constant interval when switching from the dynamic display to a static display displaying an image different from the plurality of images.

In the image displaying apparatus according to the aspect of embodiment, the display controlling section may display a blackout image on the displaying section when switching from the dynamic display to the static display.

In the image displaying apparatus according the aspect of embodiment, the luminance adjusting section may provide a period lowering a light quantity of the displaying section to a predetermined value during a displaying period displaying the blackout image on the displaying section.

An imaging apparatus according to an aspect of embodiment includes the image displaying apparatus according to the aspect, and an image sensor capable of continuously acquiring the plurality of images at a constant interval.

In the imaging apparatus according to the aspect of embodiment, the dynamic display may be made up of a display of a through image acquired by the image sensor before or after a release operation, or a moving image acquired by the image sensor based on the release operation.

In the imaging apparatus according to the aspect of embodiment, the static display may be made up of a display of a still image acquired by the release operation or a display of a set image used at a setting time.

In the imaging apparatus according to the aspect of embodiment, the still image may include a confirmation image of an imaging state.

DETAILED DESCRIPTION OF THE EMBODIMENT

Figure 1:
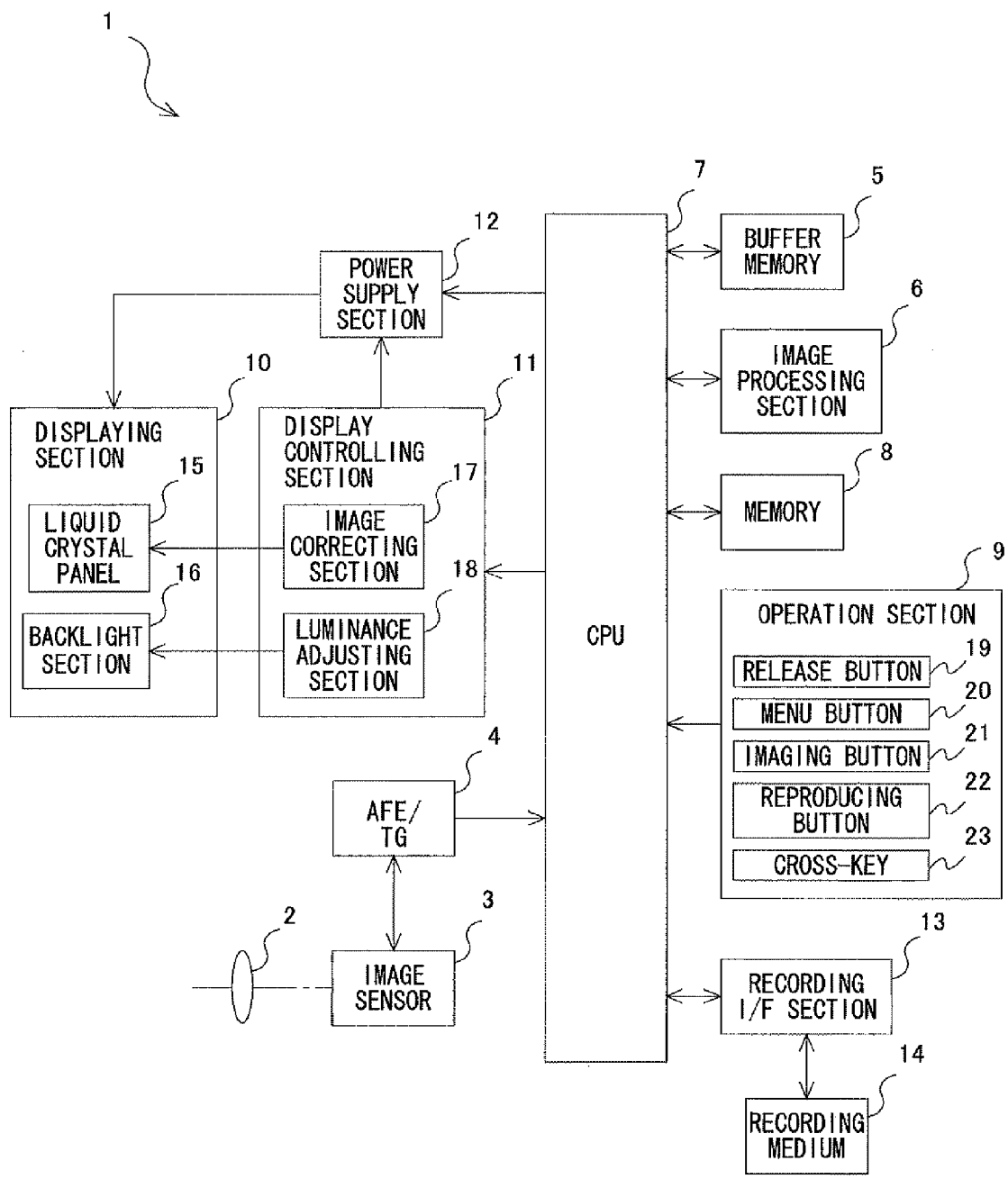
FIG. 1 illustrates a configuration of an imaging apparatus 1 according to an embodiment of the present invention.

Hereinafter, an embodiment is described by using the drawings. FIG. 1 is a block diagram illustrating a configuration of an imaging apparatus 1 according to the embodiment.

As illustrated in FIG. 1, the imaging apparatus 1 includes an imaging lens 2, an image sensor 3, an analog front end/timing generator (AFE/TG) 4, a buffer memory 5, an image processing section 6, a CPU 7, a memory 8, an operation section 9, a displaying section 10, a display controlling section 11, a power supply section 12, a recording I/F section 13, and a recording medium 14.

The imaging lens 2 forms a subject image on an imaging surface of the image sensor 3. Note that the imaging lens 2 may be made up of plural lenses such as a zoom lens and a focus lens. The image sensor 3 performs a photoelectric conversion of a subject light passing through the imaging lens 2, and outputs analog image signals corresponding to respective colors in R, G, B. The image sensor 3 performs a thinning-out reading by every predetermined interval at a standby time for imaging, and acquires a through image. After that, the image sensor 3 acquires a still image when a later-described release button 19 is fully pressed.

The AFE/TG4 supplies an output pulse to the image sensor 3. The image signal output from the image sensor 3 is input to the AFE/TG4. The AFE/TG4 performs an A/D conversion of the analog image signal output from the image sensor 3 to change into a digital image signal. Note that this digital image signal is gathered into one frame, and recorded to the buffer memory 5 as an image data. The buffer memory 5 temporary records the image data at a preceding-process or a post-process of an image processing by the image processing section 6.

The image processing section 6 performs the image processing for the image data recorded at the buffer memory 5. Incidentally, publicly known white balance adjustment, gamma correction, color interpolation, gradation conversion processing, edge emphasis processing, and so on can be cited as the image processing. Besides, the image processing section 6 also performs a process of compression of a data in PEG (Joint Photographic Experts Group) format and so on, and a process of expansion and restoration of the compressed data. The CPU 7 performs a total control of the imaging apparatus 1 in accordance with a predetermined sequence program, and executes various calculations (AF, AE, and so on) required at an imaging time. The memory 8 records firmware, a blackout image, and so on.

The operation section 9 includes the release button 19, a menu button 20, an imaging button 21, a reproducing button 22, a cross-key 23, and so on. The imaging apparatus 1 includes an imaging mode acquiring a still image or a moving image, a reproducing mode reproducing the still image or the moving image recorded at the recording medium 14, and a setting mode performing various settings of the imaging apparatus 1. The release button 19 is operated at the imaging time. The menu button 20 is operated when the mode is transferred to the setting mode. The imaging button 21 is operated when the mode is transferred to the imaging mode. The reproducing button 22 is operated when the mode is transferred to the reproducing mode. The cross-key 23 is operated at a menu image and so on displayed in the above-stated setting mode. Note that states of the release button 19, the menu button 20, the imaging button 21, the reproducing button 22 and the cross-key 23 are detected by the CPU 7, and a sequence is executed based on the detected states of the buttons or the key.

The displaying section 10 includes a liquid crystal panel 15 and a backlight section 16. The liquid crystal panel 15 displays various images by a later-described control of the display controlling section 11. A through image, a still image, a moving image, a menu image and so on can be cited as the various images displayed on the liquid crystal panel 15. Besides, the liquid crystal panel 15 displays a freeze image to confirm an imaging state after the still image is acquired. For example, an LCD (Liquid Crystal Display), a TFT (Thin Film Transistor), and so on can be cited as the liquid crystal panel 15. The backlight section 16 emits illumination light illuminating the liquid crystal panel 15.

The display controlling section 11 includes an image correcting section 17 and a luminance adjusting section 18. The image correcting section 17 performs a correction enlarging an inclination of the gamma characteristic curve for the image displayed on the liquid crystal panel 15. For example, the image correcting section 17 calculates a rate of a white region in an image one frame previous to an image being a display object. A method to calculate the rate of the white region is performed, for example, as stated below. The image correcting section 17 divides the image into plural small regions, and calculates respective color components in R, G, B of the respective small regions. The respective color components in R, G, B of the small regions are averages values of the respective color components in R, G, B of respective pixels belonging to the small regions. The image correcting section 17 calculates the rates of the respective color components in R, G, B of the respective small regions. The rates of the respective color components in R, G, B can be acquired by calculating R/(R+G+B), G/(R+G+B), B/(R+G+B). For example, the image correcting section 17 judges that the small region is an achromatic color if all of the rates of the respective color components in R, G, B exceed 30%. Further, the image correcting section 17 compares the average value of the respective color components in R, G, B of the respective small regions judged to be the achromatic color with a threshold value, and regards the small region exceeding the threshold value as the white region. Further, the image correcting section 17 calculates a rate of the white region on the image by dividing the number of small regions regarded as the white regions by the total number of small regions.

The image correcting section 17 performs a correction to increase a gamma value representing the inclination of the gamma characteristic curve for the image to be the display object as the rate of the white region is high. Note that the image correcting section 17 also performs the correction to increase the gamma value for an image of which rate of the white region is low. The image correcting section 17 displays the image on the liquid crystal panel 15 by using RGB image signals of which gamma values are corrected.

The luminance adjusting section 18 adjusts luminance of the backlight section 16. For example, the luminance adjusting section 18 decreases a light emission amount of the backlight section 16 in accordance with the gamma value used by the image correcting section 17 to thereby lower the luminance of the backlight section 16. Hereinafter, the above-stated processes of the image correcting section 17 and the luminance adjusting section 18 are called as correction processing. Note that the display controlling section 11 performs the correction processing so that appearances of the images of before and after the correction processing become the same.

The display controlling section 11 executes the correction processing by an execution command of the correction processing transmitted by the CPU 7. For example, the display controlling section 11 executes the correction processing when the through image is displayed and the moving image is reproduced. Besides, the display controlling section 11 terminates the correction processing by a termination command of the correction processing transmitted by the CPU 7. For example, the display controlling section 11 terminates the correction processing when the menu image is displayed and the still image is reproduced. Accordingly, the luminance of the backlight section 16 is constant when the menu image is displayed and the still image is reproduced. Note that the luminance of the still image and the menu image can be set by a designation of a user via the cross-key 23. Besides, the display controlling section 11 executes the correction processing during a period shorter than one Vsync (Vertical synchronizing signal) period by a speed-up command transmitted by the CPU 7. The display controlling section 11 returns the speed of the correction processing to an original speed by a speed-down command transmitted by the CPU 7. Note that the Vsync is a timing of a vertical synchronization signal when the image is displayed on the liquid crystal panel 15, and the period of one Vsync is approximately 16 ms. Hereinafter, a period shorter than the one Vsync (Vertical synchronizing signal) period is called as steepness.

The power supply section 12 supplies power to each part of the imaging apparatus 1. Besides, the display controlling section 11 changes the light emission amount of the backlight section 16. The recording I/F section 13 includes a connector to couple the recording medium 14. The recording I/F section 13 and the recording medium 14 are coupled, and thereby, read/write of the data for the recording medium 14 is executed.

Figure 2:
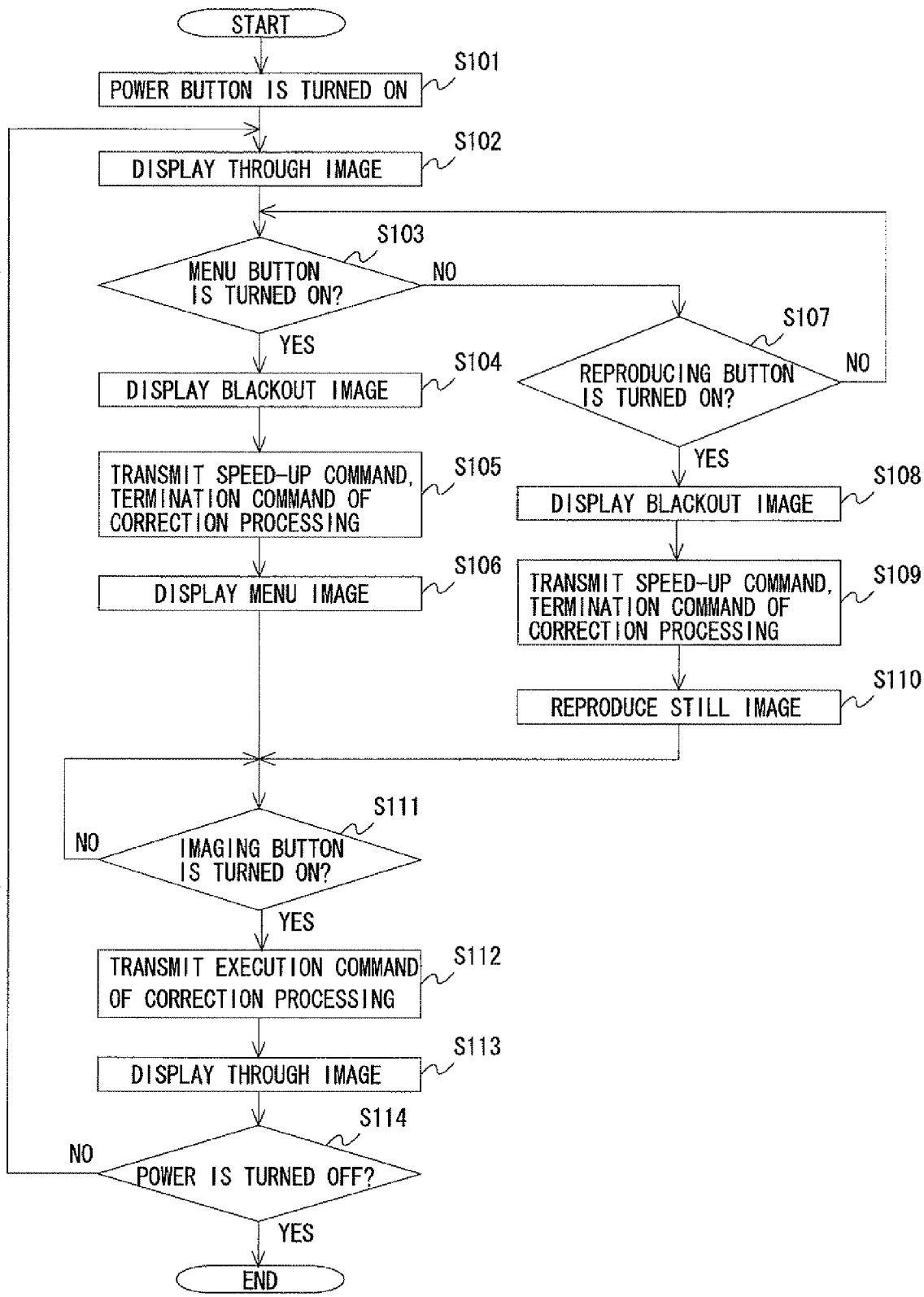
FIG. 2 illustrates operations at a switching time from a through image display to a menu image display or a still image reproduction.

FIG. 2 is a flowchart illustrating operations at a switching time from a through image display to a menu image display or a still image reproduction.

Step S101 is a process detecting that a power button is pressed. The CPU 7 starts the imaging mode and transmits the execution command of the correction processing to the display controlling section 11 when the CPU 7 detects that the not-illustrated power button is pressed under a power OFF state.

Step S102 is a process displaying the through image. The image correcting section 17 performs the gamma correction to the through image, and displays the through image after the gamma correction on the liquid crystal panel 15. The luminance adjusting section 18 decreases the light emission amount of the backlight section 16 in accordance with the gamma value used by the image correcting section 17. As stated above, the image correction section 17 performs the gamma correction based on the rate of the white region. Accordingly, it is possible to perform the gamma correction easily without using an output signal of a photometric sensor and so on. Besides, it is possible to suppress the power consumption of the power supply section 12 by decreasing the light emission amount of the backlight section 16.

Step S103 is a process judging whether or not the menu button 20 is pressed. When the menu button 20 is pressed (when a judgment at the step S103 becomes YES), the mode is switched to the setting mode, and the process goes to step S104. On the other hand, when the menu button 20 is not pressed (when the judgment at the step S103 becomes NO), the process goes to later-described step S107.

Step S104 is a process displaying a blackout image. The display controlling section 11 finishes the display of the through image, and displays the blackout image on the liquid crystal panel 15.

Step S105 is a process transmitting the speed-up command and the termination command of the correction processing. The CPU 7 transmits the speed-up command and the termination command of the correction processing to the display controlling section 11. The luminance adjusting section 18 steeply decreases the luminance of the backlight section 16 to "0" (zero) when the speed-up command is received. The processes of the image correcting section 17 and the luminance adjusting section 18 are terminated by the termination command of the correction processing.

Step S106 is a process displaying the menu image. The display controlling section 11 finishes the display of the blackout image, and displays the menu image on the liquid crystal panel 15.

Step S107 is a process judging whether or not the reproducing button 22 is pressed. When the reproducing button 22 is pressed (when a judgment at the step S107 becomes YES), the mode is switched into the reproducing mode, and the process goes to step S108. Hereinafter, an example to reproduce the still image is described. On the other hand, when the reproducing button 22 is not pressed (when the judgment at the step S107 becomes NO), the process returns to the step S103, and it is judged whether or not the menu button 20 is pressed.

Step S108 to step S109 are processes similar to the step S104 to the step S105.

Step S110 is a process reproducing the still image. The display controlling section 11 finishes the display of the blackout image. The display controlling section 11 reproduces the still image read out of the recording medium 14 by the CPU 7 on the liquid crystal panel 15. Note that the still image read by the CPU 7 at this time is the still image of which imaged date and time is the newest among the still images recorded at the recording medium 14.

Step S111 is a process judging whether or not the imaging button 21 is pressed. When the imaging button 21 is pressed (when a judgment at the step S111 becomes YES), the mode is switched to the imaging mode, and the process goes to step S112. On the other hand, when the imaging button 21 is not pressed (when the judgment at the step S111 becomes NO), the process stands by until the imaging button 21 is pressed.

Step S112 is a process transmitting the execution command of the correction processing. The CPU 7 transmits the execution command of the correction processing to the display controlling section 11.

Step S113 is a process displaying the through image. The display controlling section 11 executes the correction processing at the timing when the Vsync is transmitted after the through image is displayed. It is because the user cannot recognize the change in the luminance of the backlight section 16 if the correction processing is started during the display of the through image.

Step S114 is a process judging whether or not the power button is pressed. When the power button is pressed (when a judgment at the step S114 becomes YES), the processes in FIG. 2 are finished. When the power button is not pressed (when the judgment at the step S114 becomes NO), the process returns to the step S102.

Figure 3:
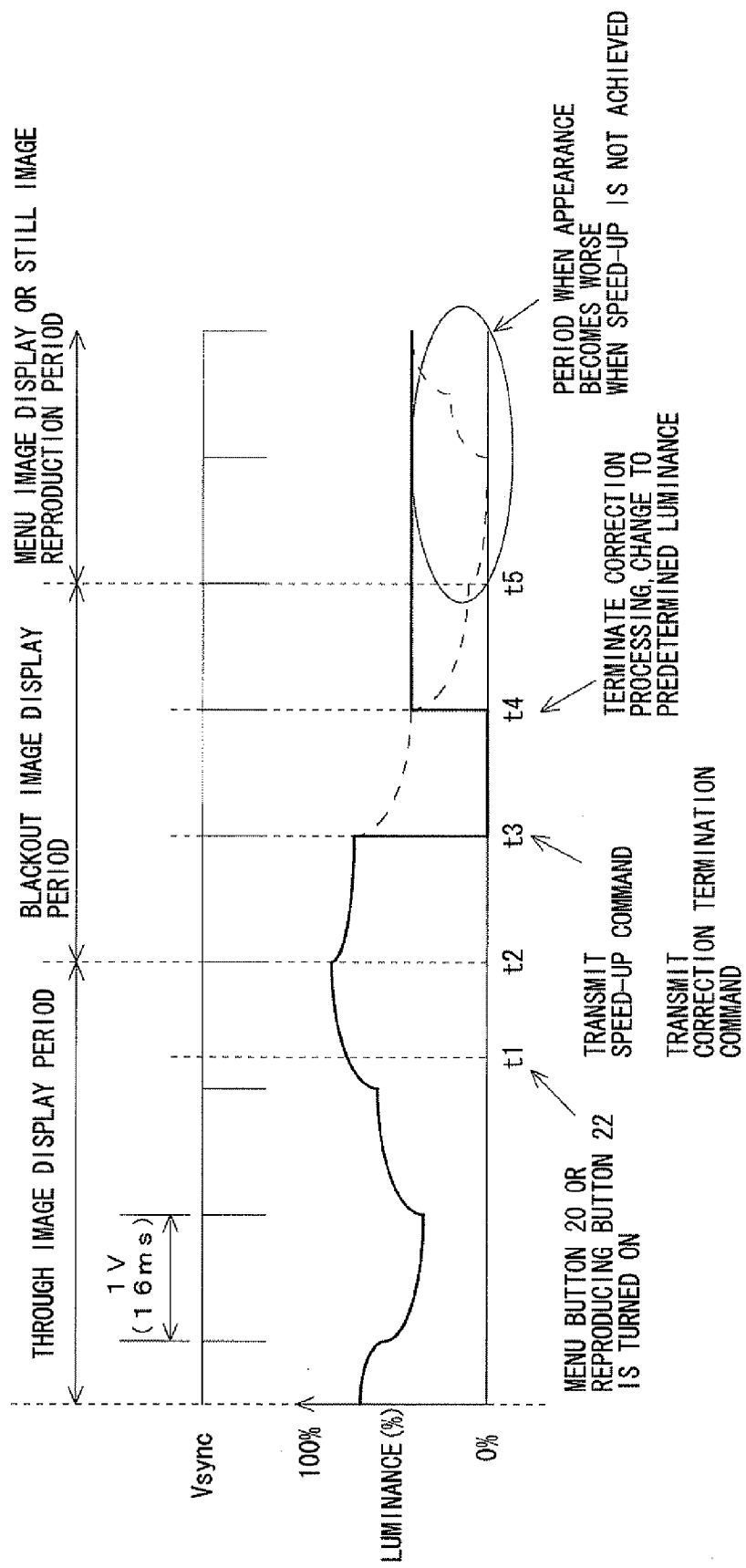
FIG. 3 illustrates operations of each part in a flowchart in FIG. 2.

FIG. 3 is a timing chart illustrating operations of each part in FIG. 2. Besides, an example of the luminance of the backlight section 16 is represented by a solid line. The through image to which the gamma correction is performed by the image correcting section 17 is displayed on the liquid crystal panel 15 at an interval of one Vsync. At this time, when the menu button 20 or the reproducing button 22 is pressed at a timing of t1, the display of the through image is finished and the blackout image is displayed at a timing (t2) when the next Vsync is output. Further, the speed-up command and the correction termination command are transmitted at a timing (t3) when the next Vsync is output, and the luminance of the backlight section 16 is steeply lowered to "0" (zero). The correction function of the display controlling section 11 is terminated at a timing of t4 after a wait for one Vsync period. In accordance with the above, the luminance of the backlight section 16 is steeply changed into a predetermined value set in advance. The display of the blackout image is finished at a timing (t5) when the next Vsync is output, and the menu image is displayed or the still image is reproduced.

An example of luminance when the luminance is not steeply adjusted in a conventional imaging apparatus is represented by a dotted line in FIG. 3. In this case, the luminance of the backlight section 16 increases gradually after t5, and therefore, an unintended change in the display image occurs, and the appearances of the menu image and the still image become worse. However, in the imaging apparatus 1, the luminance is steeply adjusted, and therefore, the display period of the blackout image becomes for a short period of three Vsyncs. Accordingly, a switching without giving any stress for the user is enabled. Besides, the luminance of the backlight section 16 becomes constant after t4, and therefore, there is no possibility in which the appearance of the menu image or the still image becomes worse.

Figure 4:
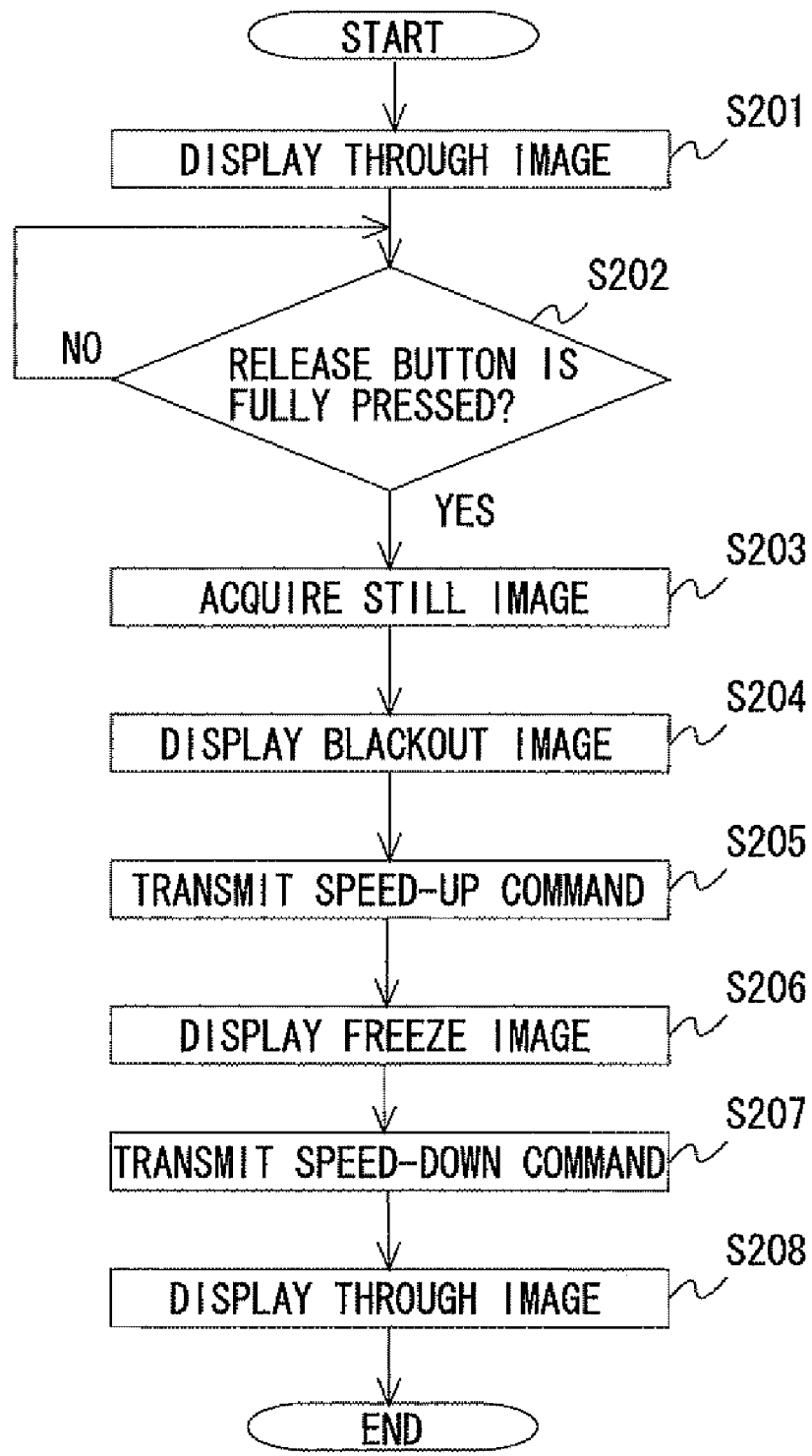
FIG. 4 illustrates operations at an imaging time.

Next, an example is illustrated in which the display state changes from the through image to the display of the freeze image, and returns to the display of the through image. FIG. 4 is a flowchart illustrating operations at the imaging time.

Step S201 is a process displaying the through image. The display controlling section 11 performs the similar process as the step S102.

Step S202 is a process judging whether or not the release button 19 is fully pressed. When the release button 19 is fully pressed (when a judgment at the step S202 becomes YES), the process goes to step S203. On the other hand, when the release button 19 is not fully pressed (when the judgment at the step' S202 becomes NO), the process waits until the release button 19 is fully pressed.

Step S203 is a process acquiring the still image. The image sensor 3 acquires the still image.

Step S204 is a process displaying the blackout image. The display controlling section 11 finishes the display of the through image, and displays the blackout image on the liquid crystal panel 15.

Step S205 is a process transmitting the speed-up command. The CPU 7 transmits the speed-up command to the display controlling section 11. The luminance adjusting section 18 steeply lowers the luminance of the backlight section 16 to "0" (zero) when the speed-up command is received. Besides, the image processing section 6 generates the freeze image based on the still image acquired at the step S203. Note that the CPU 7 does not transmit the command to terminate the correction processing to the display controlling section 11 so as to return to the display of the through image within a short period of time.

Step S206 is a process displaying the freeze image. The display controlling section 11 displays the freeze image generated at the step S205 on the liquid crystal panel 15.

Step S207 is a process transmitting the speed-down command. The CPU 7 transmits the speed-down command to the display controlling section 11. The display controlling section 11 returns a speed of the correction processing to the original speed.

Step S208 is a process displaying the through image. The display controlling section 11 performs the similar process as the step S102, and finishes a series of processes.

Figure 5:
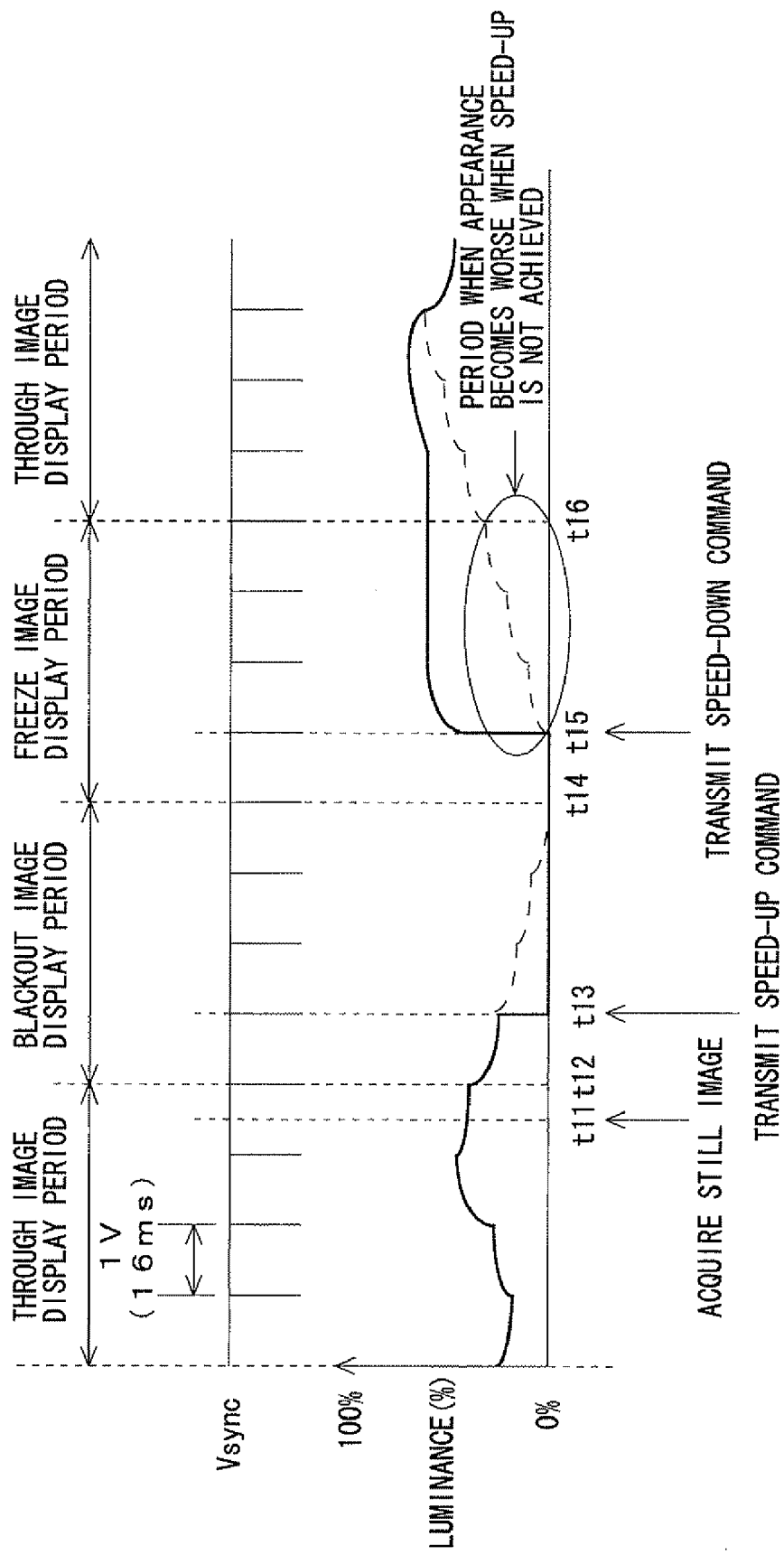
FIG. 5 illustrates operations of each part in a flowchart in FIG. 4.

FIG. 5 is a timing chart illustrating operations of each part in the flowchart in FIG. 4. Besides, an example of the luminance of the backlight section 16 is represented by a solid line. The through image to which the gamma correction is performed by the image correcting section 17 is displayed on the liquid crystal panel 15 at an interval of one Vsync. At this time, the release button 19 is fully pressed, the still image is acquired at a timing of t11, then the display of the through image is finished at a timing (t12) when the next Vsync is output, and the blackout image is displayed. Further, the speed-up command is transmitted at a timing (t13) when the next Vsync is output, and the luminance of the backlight section 16 is steeply lowered up to "0" (zero). The blackout image is displayed for a predetermined time, and after that, the freeze image is displayed (t14). The luminance of the backlight section 16 is steeply changed at a timing (t15) when the next Vsync is output. Besides, the speed-down command is transmitted at the timing of t15. The freeze image is displayed for a predetermined time, and after that, the through image is displayed (t16).

An example of luminance when the luminance is not steeply adjusted in a conventional imaging apparatus is represented by a dotted line in FIG. 5. In this case, the luminance of the backlight section 16 gradually increases after t15, and therefore, an unintentional change in the display image occurs, and the appearance of the freeze image becomes worse. However, in the imaging apparatus 1, the luminance is steeply adjusted, and therefore, the luminance of the backlight section 16 becomes constant after t15. Accordingly, there is no possibility that the appearance of the freeze image becomes worse.

As it is described hereinabove, the imaging apparatus 1 steeply changes the luminance of the backlight section 16 during the switching period from the through image display state to the menu image display or the still image reproduction. Besides, the imaging apparatus 1 steeply changes the luminance of the backlight section 16 during the switching period from the through image display state to the freeze image display.

Accordingly, it is possible to prevent that the displays of the still image and the menu image change resulting from the backlight luminance correction and so on performed for the moving image and the through image according to the imaging apparatus 1. Besides, the switching without giving the stress to the user can be enabled because the switching period is shortened.

Incidentally, in the flowchart in FIG. 2, the example is illustrated in which the imaging mode is started at the step S101, but it is not limited to the above. For example, when the reproducing mode is started and the still image is reproduced at the step S101, the CPU 7 does not transmit the execution command of the correction processing to the display controlling section 11. Besides, the correction processing is remained to be terminated when the mode is switched from the reproducing mode to the setting mode.

In the flowchart in FIG. 2, the example is illustrated in which the still image is reproduced at the step S107, but when the moving image is reproduced, the process as same as the display of the through image is performed.

In the flowchart in FIG. 2, the example is illustrated in which the still image of which imaged date and time is the newest is displayed at the step S110, but it is not limited to the above. For example, a selection of any of the still images to be the reproduction object may be accepted from the user via the cross-key 23 among the still images recorded at the recording medium 14.

In the above-stated embodiment, the examples of the through image, the moving image, the still image, the menu image, and the freeze image are illustrated, but the images to be displayed are not limited to the above. For example, when images acquired by a continuous shooting are reproduced, the process similar to the reproduction of the moving image is performed. Besides, when an opening screen when the power is turned from an OFF state to an ON state is displayed, the process similar to the reproduction of the moving image may be performed. Besides, when a slide show display in which plural images are reproduced while being switched sequentially is performed, the process similar to the reproduction of the still image may be performed.

In the above-stated embodiment, the correction processing is the process in which the gamma value is increased and the luminance of the backlight section 16 is lowered, but it is not limited to the above. For example, the display controlling section 11 may perform a process to increase a contrast value and lower the luminance of the backlight section 16.

The one Vsync period, the display period of the blackout image and the display period of the freeze image in FIG. 5 are just examples, and they are not limited to the above.

Figure 6:
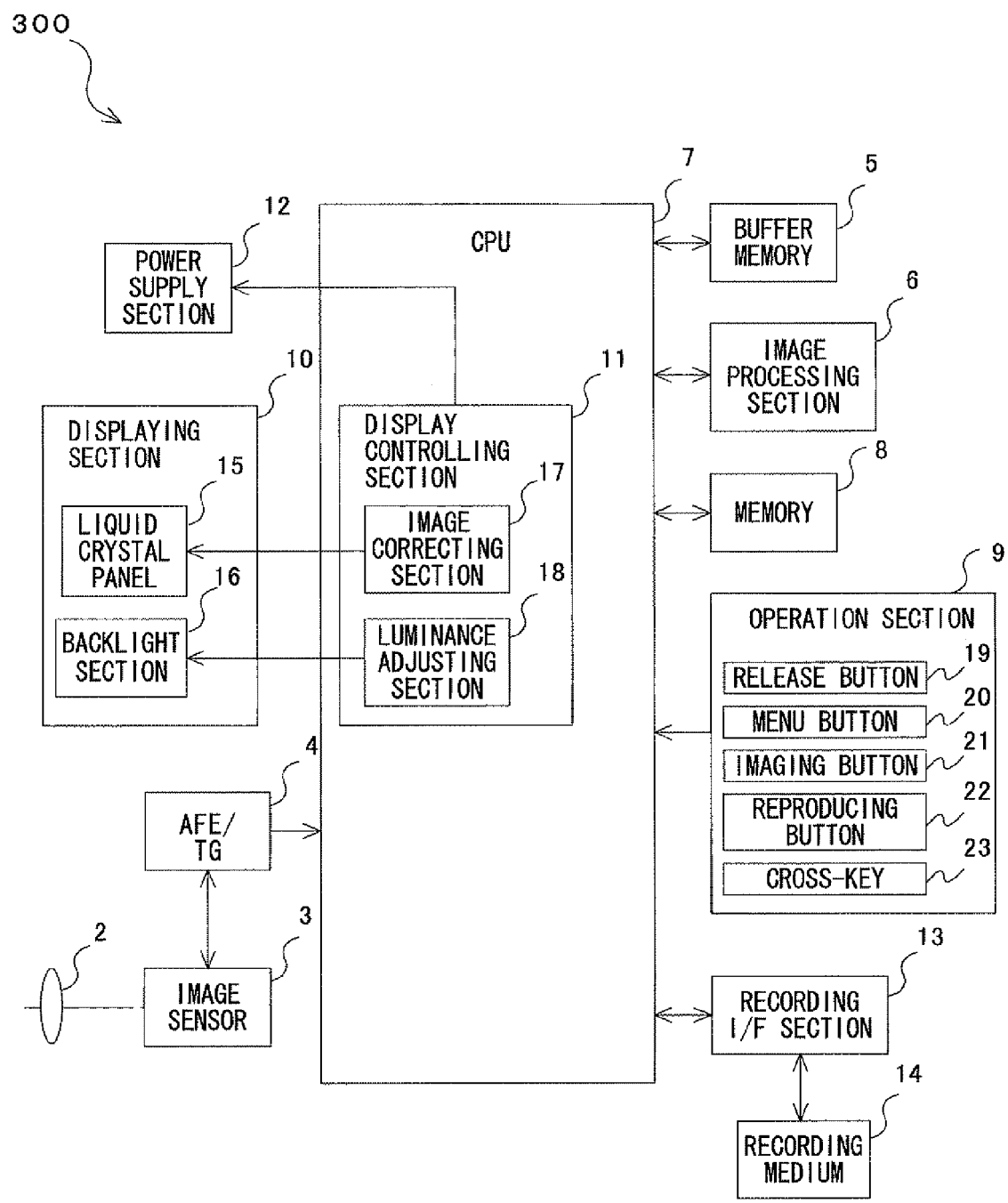
FIG. 6 illustrates a configuration of an imaging apparatus 300 according to an embodiment of the present invention.

In the above-stated embodiment, the imaging apparatus 1 is described as an example, but it is not limited to the above. For example, the present embodiment can be similarly applied to an imaging apparatus 300 having a constitution illustrated in FIG. 6. In the imaging apparatus 300, the CPU 7 has the functions of the display controlling section 11. The other constitutions are the same as the imaging apparatus 1 in FIG. 1, and therefore, the redundant description is not given.

The present embodiment can be similarly applied to an image displaying apparatus capable of reproducing the still image and the moving image acquired by the imaging apparatus 1. In this case, the image displaying apparatus includes the CPU 7, the operation section 9, the displaying section 10, the display controlling section 11, the power supply section 12, the recording I/F section 13, and the recording medium 14 of the imaging apparatus 1 in FIG. 1. The similar effects as the above-stated embodiment can be obtained by performing the similar processes as the flowchart in FIG. 2.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:

1. An image displaying apparatus, comprising:
   a displaying section comprising:
      a liquid crystal panel for displaying a plurality of images; and
      a backlight section for emitting light illuminating the liquid crystal panel;
   a display controlling section performing a display control of the displaying section, wherein the display controlling section comprises:
   an image correcting section performing a luminance correction on each of the plurality of images at a time of a dynamic display continuously displaying the plurality of images on the liquid crystal panel at a constant interval; and
   a luminance adjusting section performing a luminance adjustment of the backlight section when displaying the images to which the luminance correction is performed based on the luminance correction at the image correcting section;
   wherein the display controlling section
      displays by once switching from the dynamic display to a blackout image when switching from the dynamic display to a static display displaying an image different from the plurality of images,
      lowers a value of luminance in the displaying section to a zero percent value by steeply performing the luminance adjustment at the displaying section when displaying the blackout image on the displaying section, and
      stops the luminance correction at the image correcting section during a period of displaying the blackout image on the displaying section and simultaneously switches from displaying the blackout image to the dynamic display after steeply changing the value of the luminance in the displaying section from the zero percent value to a value of luminance in the static display.

2. An imaging apparatus, comprising:
   the image displaying apparatus according to claim 1; and
   an image sensor capable of continuously acquiring the plurality of images at a constant interval.

3. The imaging apparatus according to claim 2, wherein the dynamic display is made up of a display of one of a through image acquired by the image sensor before or after a release operation and a moving image acquired by the image sensor based on the release operation.

4. The imaging apparatus according to claim 2, wherein the static display is made up of a display of one of a still image acquired by the release operation and a set image used at a setting time.

5. The imaging apparatus according to claim 4, wherein the still image includes a confirmation image of an imaging state.

* * * * *

UNITED STATES PATENT AND TRADEMARK OFFICE
CERTIFICATE OF CORRECTION

| | |
|---|---|
| PATENT NO. | : 8,411,023 B2 |
| APPLICATION NO. | : 12/796022 |
| DATED | : April 2, 2013 |
| INVENTOR(S) | : Akihiro Ozone |

It is certified that error appears in the above-identified patent and that said Letters Patent is hereby corrected as shown below:

In the Specification:

In column 8, lines 11-12, delete "the still image is reproduced at the step S101," and insert -- the still image is reproduced at the step S110, --, therefor.

In the Claims:

In column 10, lines 11-12, in Claim 1, delete "the dynamic display after" and insert -- the static display after --, therefor.

Signed and Sealed this
First Day of April, 2014

Michelle K. Lee
*Deputy Director of the United States Patent and Trademark Office*